Patented Sept. 15, 1936

2,054,433

UNITED STATES PATENT OFFICE 2,054,433

MANUFACTURE OF LUBRICATING OIL

Robert E. Manley, Beacon, N. Y., assignor to The Texas Company, New York, N. Y., a corporation of Delaware No Drawing. Application March 9, 1932, Serial No. 597,795

4 Claims. (Cl. 196—17)

This invention relates to the manufacture of hydrocarbon lubricating oils and particularly to the manufacture of high viscosity index oil having a low pour test as well as other desirable characteristics from wax-bearing mineral oil.

The invention contemplates a process of manufacturing high viscosity index low pour test oil from wax-bearing lubricating oil fractions comprising extracting the wax-bearing fraction with a solvent liquid adapted to remove therefrom undesired hydrocarbon constituents including those of low viscosity index, then dewaxing the extracted oil and treating the dewaxed oil by chemical or other means to produce a final product of desired characteristics.

My invention comprises mixing a wax-bearing lubricating oil fraction with a solvent of the type such as furfural or a derivative thereof which has a selective solvent action between the low viscosity index constituents and the high viscosity index constituents of the oil at temperatures above the pour point thereof. The major portion of the furfural, together with undesirable hydrocarbon constituents extracted from the oil, is removed and the solvent recovered therefrom. The extracted oil of high viscosity index is then mixed with an additional quantity of furfural or other solvent or diluent liquid and the resulting mixture chilled to precipitate the wax constituents which may be separated from the chilled mixture as, for example, by filtration. The solvent or diluent in this dewaxing operation may comprise additional quantities of furfural together with benzol or one of its homologs such as described in my copending application, Serial No. 597,794, filed March 9, 1932 entitled "Manufacture of lubricating oils". On the other hand, the dewaxing solvent may comprise other organic liquids, for example, a mixture comprising an aliphatic ketone with benzol or one of its homologs such as a mixture of acetone and benzol. It is contemplated that a light petroleum fraction, such as naphtha, may also be employed as the diluent liquid to form with the oil a mixture from which the wax constituents are precipitated upon chilling.

After removal of the precipitated wax, the solvent or diluent liquid is recovered from the dewaxed mixture and the remaining dewaxed oil may then be subjected to final treatment with mineral acid followed by contacting with a solid adsorbent material to produce the desired product.

According to the usual commercial practice followed in manufacturing lubricating oil from wax distillates or from residual cylinder stocks, the wax-bearing oil is first subjected to treatment with sulphuric acid for the purpose of removing undesirable constituents, especially the carbon-forming bodies, as indicated by the customary laboratory test for carbon residue. The acid-treated oil is then neutralized with an alkaline material or may be subjected to contact filtration in the presence of a comminuted solid adsorbent material for the purpose of decolorizing the oil. The acid-treated and clay-contacted oil is next subjected to dewaxing to remove the waxy constituents and produce a product of low pour test which, in many cases, requires an additional treatment with clay or other material to improve the color.

It has been proposed in the past to remove naphthenic bodies from wax-bearing oil using liquid sulphur dioxide, acetone or nitrobenzene. However, sulphur dioxide exerts a selective solvent action on the various constituents of the oil only at temperatures below 32° F. Its use as an extracting agent is, therefore, limited to dewaxed oils having a very low pour point and it is not adapted to the extraction of wax distillates or cylinder stocks such as contemplated in my invention and which may have pour points of around 75° F., and usually around 100° F. to 115° F. or higher. Similar difficulties are met with when using acetone or nitrobenzene as extracting agents since their selectivity, like that of sulphur dioxide, decreases with increasing temperature.

Consequently, when extracting hydrocarbon oil with such solvents as these, it is necessary to heat the mixture in order to effect solution of the oil in the solvent and then chill the solution to a subatmospheric temperature, for example, 50° F. or below in order to effect separation of the desired constituents. Then after removal of the separated matter, the remaining mixture must be heated up to remove the solvent or to facilitate mixing in additional solvent liquid prior to chilling and dewaxing. This procedure, therefore, involves repeated chillings and reheating, thereby necessitating a large amount of refrigeration. This additional refrigeration is required regardless of whether the extraction step is carried out before or after the dewaxing step.

In accordance with the process of my invention, the wax-bearing oil is subjected to extraction with furfural at atmospheric temperature or above to remove the low viscosity index constituents, which may comprise 20% of the charge, prior to chilling and dewaxing, thereby decreasing the amount of refrigeration. Further economy also results in that by acid treating the final product rather than the raw charge a smaller quantity of oil is subjected to acid treatment and the loss of oil and acid in the sludge resulting from such acid treatment is only a fraction of that resulting when acid-treating the original stock. Consequently, my process permits of a greater economy, not only as regards the use of treating reagents but also as to the yield of the finished product.

In practicing my invention, I may start out with a wax distillate fraction, such as that derived by vacuum distillation of a mixed base crude which has the following characteristics:

| | |
|---|---|
| Gravity A. P. I. | 23.9 |
| Percent sulphur | 0.6 |
| Percent carbon residue | 1.0 |
| Pour ° F | 110 |
| Saybolt universal viscosity at 210° F | 64 |

This distillate is then preferably treated with furfural by a continuous countercurrent process, such as that described in my copending application Serial No. 597,141 filed March 7, 1932, entitled, "Solvent refining of hydrocarbon oil". In this case, the proportion of furfural to oil may be in the proportion of two parts of furfural to one part of oil, and the treatment carried out while maintaining the mixture at a temperature of about 150° F. The temperature is not limited to this and may be lower though advantageously above the pour point of the oil and usually ranging from about 125° F. to about 200° F.

The extracted oil, after removal of the solvent, will have the following tests:

| | |
|---|---|
| Gravity A. P. I. | 28.9 |
| Percent sulphur | .32 |
| Percent carbon residue | .25 |
| Pour ° F | 115 |
| Saybolt universal viscosity at 210° F | 61 |

The extracted oil may contain around 5% to 10% of dissolved furfural which may or may not be removed, depending upon whether or not it is desired to employ as a dewaxing solvent a liquid mixture comprising furfural and benzol. Where it is desired to use other dewaxing solvents as, for example, acetone and benzol, or a light petroleum fraction such as naphtha, it may then be desirable to first remove the furfural which can advantageously be done by the method disclosed in my last mentioned copending application or by distillation.

However, since furfural in admixture with benzol or toluol, etc., provides a solvent mixture which is readily adaptable for the purpose of removing the wax constituents, it is, therefore, advantageous to add an additional quantity of furfural together with sufficient benzol to form a mixture with the oil from which the wax constituents are precipitated upon cooling. Such a solvent mixture may comprise about 20% of furfural and about 80% of benzol.

This mixture is chilled by passage through suitable chilling coils to a temperature around 0° F. or lower to effect precipitation of the wax constituents. The chilled mixture, still maintained in a cold condition, is then introduced to filtering means to remove the precipitated wax constituents.

If desired, a comminuted solid filter-aid material may be mixed with the chilled mixture prior to its introduction to the filter for the purpose of facilitating the filtering operation.

The resulting filter cake may be subjected to washing with fresh solvent liquid to remove adhering mother liquor. This solvent wash, together with dissolved oil, may be added to the initial filtrate or, if desired, may be kept separate and used for dissolving fresh oil.

The resulting filtrate, consisting of solvent and dewaxed oil, is then subjected to heating in order to distill off the solvent liquids. The benzol, being relatively more volatile, will be recovered substantially free from furfural. The furfural can be distilled off by heating to still higher temperatures, or, if desired, may be displaced from the oil by heating the mixture in the presence of water, as has been fully described in my last mentioned copending application.

The dewaxed oil, after removal of the solvent, may, in some instances, be finished up by contacting with solid adsorbent material without any further treatment to produce a satisfactory product. However, in order to produce a product having a low carbon residue and sulphur content, it may be desirable to treat the dewaxed oil with sulphuric acid followed by a treatment with clay or other contacting agent.

Impurities remaining in the solvent extracted oil are, in part, due to incomplete separation between the extract and raffinate phases during the solvent extraction step; that is, the raffinate phase retains admixed therewith some of the extract phase.

In recovering the extraction solvent from the raffinate phase by the usual methods involving distillation or displacement with water, as referred to in my copending application, Serial No. 597,141, the extraction solvent is removed, leaving some extract phase oil remaining in the raffinate oil. It is, therefore, advantageous to subject the raffinate oil, after removal of the solvent, to further treatment as above referred to in order to remove these retained impurities and thus produce a completely refined product.

By treating the oil with about twenty pounds per barrel of 98% acid and then contacting the acid-treated oil with an acid-treated clay in the proportion of about twenty pounds per barrel, at a temperature of around 450° to 500° F., the resulting product will have substantially the following tests:

| | |
|---|---|
| Gravity A. P. I. | 27.5 |
| Percent sulphur | .21 |
| Percent carbon residue | .13 |
| Pour 0° F | 0 |
| Saybolt universal viscosity at 210° F | 65 |
| Viscosity index | 90 |

The invention is not limited to the treatment of wax distillate such as given in the foregoing example but is adapted to the treatment of other paraffin fractions obtained from crude oils; nor is the invention restricted to any particular operating condition such as that of temperature or the proportion of solvent to oil, since these conditions may be advantageously varied, depending upon the nature of the fraction undergoing treatment as well as upon the particular characteristics desired in the final product.

Obviously many modifications and variations of the invention, as hereinbefore set forth, may be made without departing from the spirit and scope thereof, and therefore only such limitations should be imposed as are indicated in the appended claims.

I claim:
1. The method of manufacturing high viscosity index oil of low pour test from viscous undewaxed cylinder stock derived from mixed base crude which comprises extractively mixing and separating the oil with a solvent consisting substantially of furfural at a temperature of around 200° F. at which the wax-bearing oil is in an entirely liquid phase and relatively non-viscous condition whereby intimate contact between oil and solvent is effected, and a fraction rich in naphthenic constituents of low viscosity index separates from the hot mixture, removing said separated fraction, mixing with the remaining mixture of relatively paraffinic and wax-bearing oil and furfural, additional furfural together with sufficient benzol to form a mixture with the oil in which the oil is substantially completely soluble at around 0° F. while the wax constituents are substantially insoluble therein, cooling the mixture to precipitate the wax, removing the wax thus precipitated, and recovering the solvent from the remaining oil to produce a fraction of relatively high viscosity index and low pour test.

2. The method of manufacturing high viscosity index oil of low pour test from viscous undewaxed cylinder stock derived from mixed base crude which comprises extractively mixing and separating the oil with a solvent consisting substantially of furfural at a temperature of around 200° F. at which the wax-bearing oil is in an entirely liquid phase and relatively non-viscous condition whereby intimate contact between oil and solvent is effected, and a fraction rich in naphthenic constituents of low viscosity index separates from the hot mixture, mixing with the remaining mixture of relatively paraffinic and wax-bearing oil and furfural, additional furfural together with sufficient relatively non-selective solvent liquid of the character of benzol and its homologs to form a mixture with the oil in which the oil is substantially completely soluble at around 0° F. while the wax constituents are substantially insoluble therein, cooling the mixture to precipitate the wax, removing the wax thus precipitated, and recovering the solvent from the remaining oil to produce a fraction of relatively high viscosity index and low pour test.

3. The method of extracting and dewaxing wax-bearing oil containing constituents of differing viscosity index comprising mixing the wax-bearing oil with furfural, separating the resulting mixture, while at a temperature sufficiently high to maintain the wax-bearing oil in a liquid condition, into an extract portion containing relatively low viscosity index constituents dissolved in furfural and a raffinate portion comprising relatively high viscosity index constituents including wax mixed with furfural, removing the extract portion, mixing with the raffinate a modifying solvent having the solvent action of benzol and its homologs for lubricating oil at dewaxing temperatures to form with the furfural therein a mixture having selective action as between wax and oil at temperatures of the order of 0° F., cooling the mixture to separate the wax, removing the wax therefrom, and recovering the solvent from the dewaxed oil thereby leaving a dewaxed oil having a pour test corresponding substantially to the temperature at which the wax was removed.

4. The method according to claim 3 in which the separated wax is removed from the cold mixture by filtration in the presence of a solid filter-aid material.

ROBERT E. MANLEY.